(12) United States Patent
Harvey et al.

(10) Patent No.: US 8,403,012 B2
(45) Date of Patent: Mar. 26, 2013

(54) TREAD WEAR INDICATOR

(75) Inventors: Delwyn Lovell Harvey, North Canton, OH (US); Crystal Espinoza Sherman, Akron, OH (US)

(73) Assignee: The Goodyear Tire & Rubber Company, Inc., Akron, OH (US)

( * ) Notice: Subject to any disclaimer, the term of this patent is extended or adjusted under 35 U.S.C. 154(b) by 242 days.

(21) Appl. No.: 12/952,315

(22) Filed: Nov. 23, 2010

(65) Prior Publication Data

US 2012/0125499 A1  May 24, 2012

(51) Int. Cl.
*B60C 11/24* (2006.01)

(52) U.S. Cl. .................... 152/154.2; 152/209.17

(58) Field of Classification Search ............. 152/209.17, 152/154.2; *B60C 11/24*
See application file for complete search history.

(56) References Cited

U.S. PATENT DOCUMENTS

| | | | |
|---|---|---|---|
| 2,102,784 A | 12/1937 | Bridges | |
| 2,706,509 A | 4/1955 | White | |
| 3,362,376 A | 1/1968 | Norton | |
| 3,516,467 A | 6/1970 | Sims | |
| 3,578,055 A | 5/1971 | French et al. | |
| 3,814,160 A | 6/1974 | Creasey | |
| 3,833,040 A | 9/1974 | Bins | |
| 3,929,179 A | 12/1975 | Hines | |
| 4,154,564 A | 5/1979 | French | |
| 4,226,274 A | 10/1980 | Awaya et al. | |
| 5,303,756 A | 4/1994 | Hill | |
| 5,980,668 A | 11/1999 | Slingluff | |
| 6,220,199 B1 | 4/2001 | Williams | |
| 6,523,586 B1* | 2/2003 | Eromaki et al. | 152/154.2 |
| 7,011,126 B2 | 3/2006 | Heinen | |
| 7,670,123 B2 | 3/2010 | Cuny et al. | |
| 2002/0036039 A1 | 3/2002 | Shimura | |
| 2003/0019555 A1* | 1/2003 | Nakagawa | 152/209.18 |
| 2006/0037683 A1* | 2/2006 | Cuny et al. | 152/154.2 |
| 2006/0213594 A1* | 9/2006 | Kemp et al. | 152/154.2 |
| 2007/0295432 A1 | 12/2007 | Posada et al. | |
| 2009/0095387 A1 | 4/2009 | De Barsy | |
| 2009/0095388 A1 | 4/2009 | Cuny et al. | |
| 2009/0114322 A1* | 5/2009 | O'Brien | 152/154.2 |
| 2009/0272472 A1 | 11/2009 | Takeuchi | |

FOREIGN PATENT DOCUMENTS

| | | |
|---|---|---|
| EP | 1066991 A2 | 10/2001 |
| EP | 1630008 A1 | 1/2006 |
| EP | 1066991 B1 | 4/2006 |
| EP | 2329967 A1 | 8/2011 |

* cited by examiner

*Primary Examiner* — Richard Crispino
*Assistant Examiner* — Kendra Shin
(74) *Attorney, Agent, or Firm* — Roger D. Emerson; Timothy D. Bennett; Emerson Thomson Bennett

(57) ABSTRACT

A tread wear indicator may be molded into the shoulder region of a tire tread and may have three symbols. Two of the symbols may be alphanumeric characters and the third symbol may surround the two symbols. All three symbols may be visible prior to wearing the tread. After the tread has been worn a first amount, the first symbol may be invisible and the second and third symbols may be visible to indicate to the user that a new tire will soon be required. After the tread has been worn a second amount, the first and second symbols may be invisible and the third symbol may be visible to indicate to the user that a new tire is required immediately.

19 Claims, 6 Drawing Sheets

TREAD WEAR INDICATOR

I. BACKGROUND

A. Field of Invention

This invention generally relates to methods and apparatuses concerning tire treads and more specifically relates to methods and apparatuses concerning a tire tread having a visually observable tread wear indicator.

B. Description of the Related Art

As a tire's tread wears away, the ability to maintain traction diminishes in wet or snow covered roads. Once the tread is worn beyond a certain tread depth, the groove voids become sufficiently small that the tire should be replaced to maintain adequate traction. It is thus well known to provide tire treads with a tread wear indicator (TWI) to indicate how much of the tread is worn. One example of a TWI is provided in Pub. No. US2009/0095388 titled TIRE TREAD WITH TREAD WEAR INDICATOR which is incorporated herein by reference.

While known TWIs generally work well for their intended purpose, there is a need for an improved TWI that provides a unique symbol that indicates tread wear status at multiple depths.

II. SUMMARY

According to one embodiment of this invention, a tire tread may comprise: a tread having first and second shoulder regions and a mid-section between the first and second shoulder regions, the tread also having a tread depth and an outer ground contacting surface; and, a tread wear indicator molded into the first shoulder region of the tread. The tread wear indicator may comprise first, second and third symbols. The first and second symbols may be alphanumeric characters and the third symbol may substantially surround the first and second symbols. The first, second and third symbols may be visible on the ground contacting surface prior to wearing the tread. The first symbol may be invisible and the second and third symbols may be visible on the ground contacting surface after the tread has been worn radially a first amount. The first and second symbols may be invisible and the third symbol may be visible on the ground contacting surface after the tread has been worn radially a second amount that is greater than the first amount.

According to another embodiment of this invention, a tire tread may comprise: a tread having first and second shoulder regions and a mid-section between the first and second shoulder regions, the tread also having an outer ground contacting surface and a tread depth; and, first and second treadwear indicators molded respectively into the first and second shoulder regions of the tread, each of the first and second treadwear indicators comprising substantially the same first, second and third symbols. The first symbol may be substantially S-shaped, the second symbol may be substantially W-shaped and, the third symbol may be substantially triangularly shaped and may substantially surround the first and second symbols. The first, second and third symbols may be visible on the ground contacting surface prior to wearing the tread. The first symbol may be invisible and the second and third symbols may be visible on the ground contacting surface after the tread has been worn radially a first amount of between 70% and 95% inclusively of the tread depth. The first and second symbols may be invisible and the third symbol may be visible on the ground contacting surface after the tread has been worn radially a second amount that is greater than the first amount.

According to yet another embodiment of this invention, a method may comprise the steps of: (A) providing a tire comprising a tire tread having: (1) first and second shoulder regions; (2) a mid-section between the first and second shoulder regions; (3) an outer ground contacting surface; (4) a tread depth and, (5) a first treadwear indicator positioned on the first shoulder region of the tread; wherein the first treadwear indicator comprises first and second symbols that are alphanumeric characters and a third symbol that substantially surrounds the first and second symbols; (B) providing the first, second and third symbols to be visible on the ground contacting surface prior to wearing the tread; (C) wearing the tread radially a first amount resulting in: (1) the first symbol becoming invisible on the ground contacting surface; and, (2) the second and third symbols remaining visible on the ground contacting surface; and, (D) wearing the tread radially a second amount that is greater than the first amount resulting in: (1) the first symbol remaining invisible on the ground contacting surface; (2) the second symbol becoming invisible on the ground contacting surface; and, (3) the third symbol remaining visible on the ground contacting surface.

One advantage of this invention is that a person can easily determine when a tire has reached significant stages of wear.

Another advantage of this invention is that the symbols used on the TWI may include alphanumeric characters that provide immediate meaning to the person inspecting the tire.

Other benefits and advantages of the invention will become apparent to those skilled in the art to which it pertains upon a reading and understanding of the following detailed specification.

III. DEFINITIONS

The following definitions are applicable to the present invention.

"Axial" and "axially" mean lines or directions that are parallel to the axis of rotation of the tire.

"Carcass" means the tire structure apart from the belt structure, tread, undertread, and sidewall rubber over the plies, but including the beads.

"Equatorial plane (EP)" means the plane perpendicular to the tire's axis of rotation and passing through the center of its tread.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". A "sipe" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to the tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove is of substantially reduced depth as compared to wide circumferential grooves which they interconnect, they are regarded as forming "tie bars" tending to maintain a rib-like character in the tread region involved. A groove may be formed by steel blades inserted into a cast or machined mold or tread ring therefore.

"Inner" means toward the inside of the tire.
"Outer" means toward the outside of the tire.
"Radial" and "radially" are used to mean directions radially toward or away from the axis of rotation of the tire.
"Tread" means a molded rubber component which, when bonded to a tire casing, includes that portion of the tire that comes into contact with the road when the tire is normally inflated and under normal load. The tread has a depth conventionally measured from the tread outer surface to the bottom of the deepest groove of the tire.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

V. DETAILED DESCRIPTION OF EMBODIMENTS OF THE INVENTION

Figure 1:
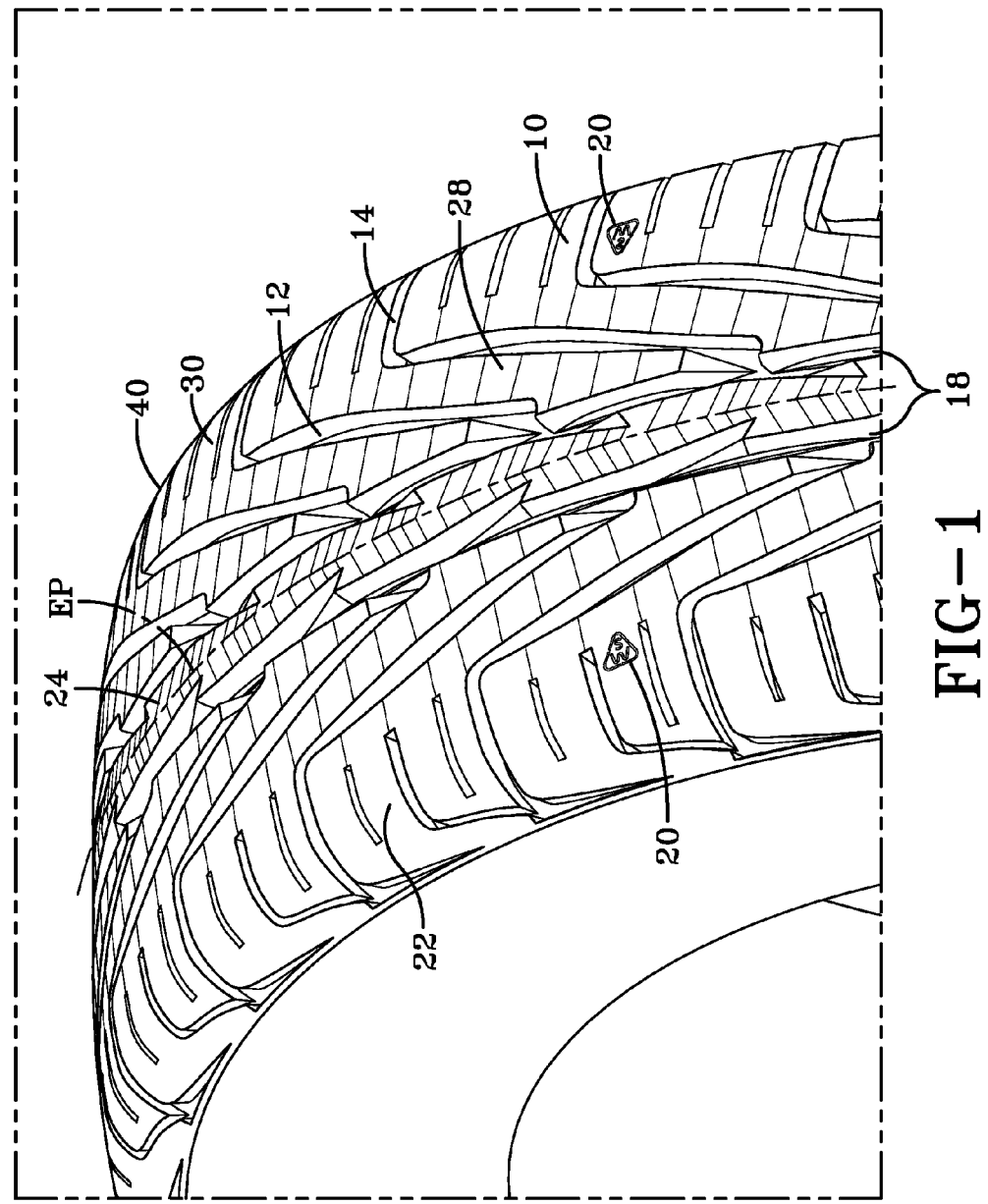
FIG. 1 is a perspective view of a portion of an unworn tire.

Referring now to the drawings wherein the showings are for purposes of illustrating embodiments of the invention only and not for purposes of limiting the same, and wherein like reference numerals are understood to refer to like components, FIG. 1 illustrates a portion of a tire 40 having a tread 10 with a tread wear indicator (TWI) 20 according to one embodiment of this invention. The tire 40, which has an equatorial plane EP, can be of any type and size chosen with the sound judgment of a person of skill in the art including, for some non-limiting examples, a truck tire, a light truck tire or a passenger tire. The tread 10 may also be of any type and size chosen with the sound judgment of a person of skill in the art. The tread 10 may have a pair of shoulders regions 30, 22, a mid-section 24 between the shoulders regions 30, 22, an outer ground contacting surface 28 and, a tread depth TD, labeled in FIG. 3. The tread 10 may have one or more circumferential grooves 12 and one or more lateral grooves 14. As the use of a tire and a tire tread are well known to those of skill in the art, further details will not be provided here except as noted below.

With continuing reference to FIG. 1, while the number and locations, including the circumferential locations, of the TWIs 20 can be any chosen with the sound judgment of a person of skill in the art, for the embodiment shown one TWI 20 is positioned into each shoulder region 22, 30. While the TWIs 20 may be put in the tread 10 in any manner chosen with the sound judgment of a person of skill in the art, for the embodiment shown the TWIs 20 are molded into the tread 10 during the vulcanization process.

Figure 2:
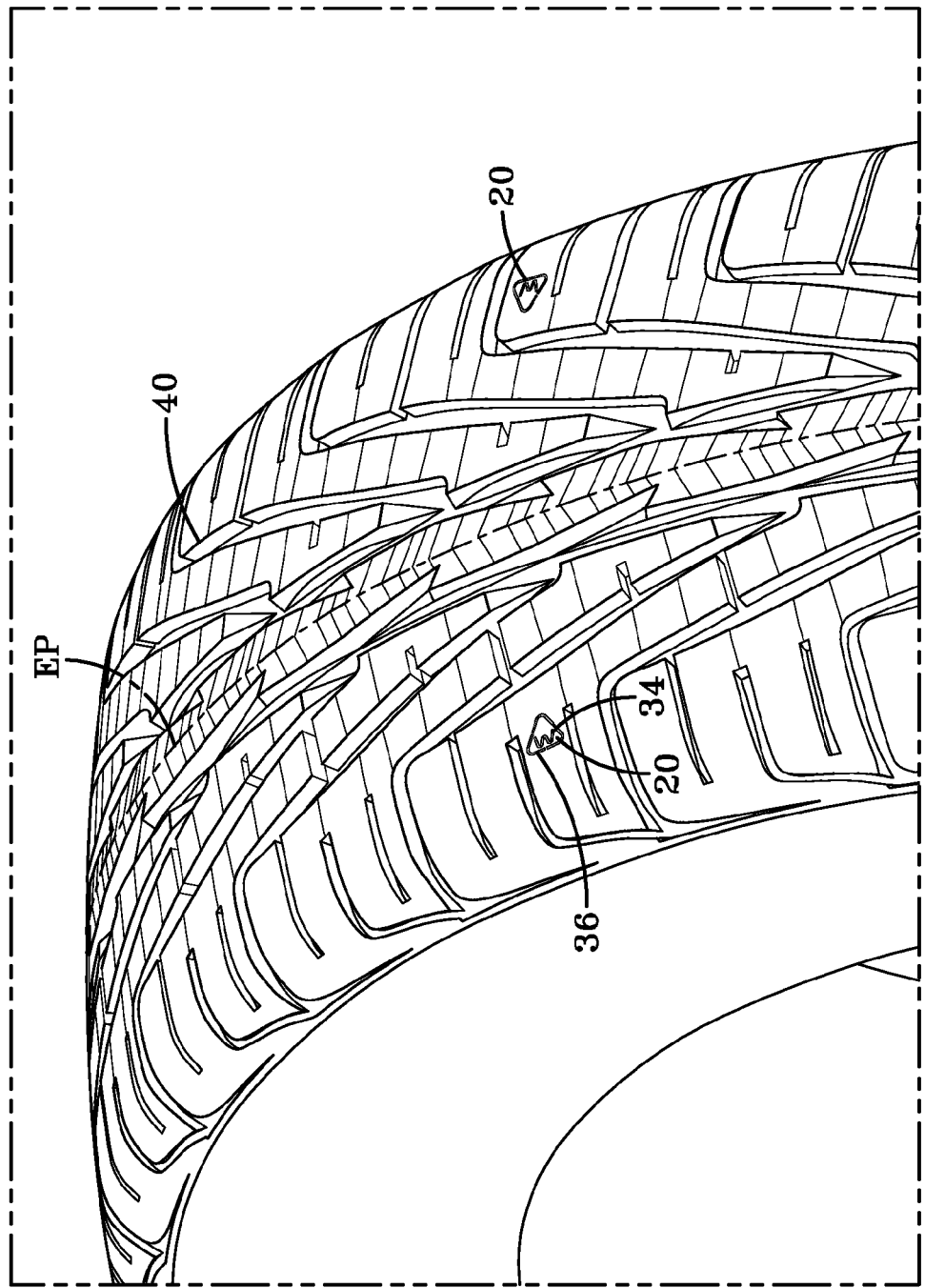
FIG. 2 is a perspective view of a portion of a partially worn tire.
Figure 3:
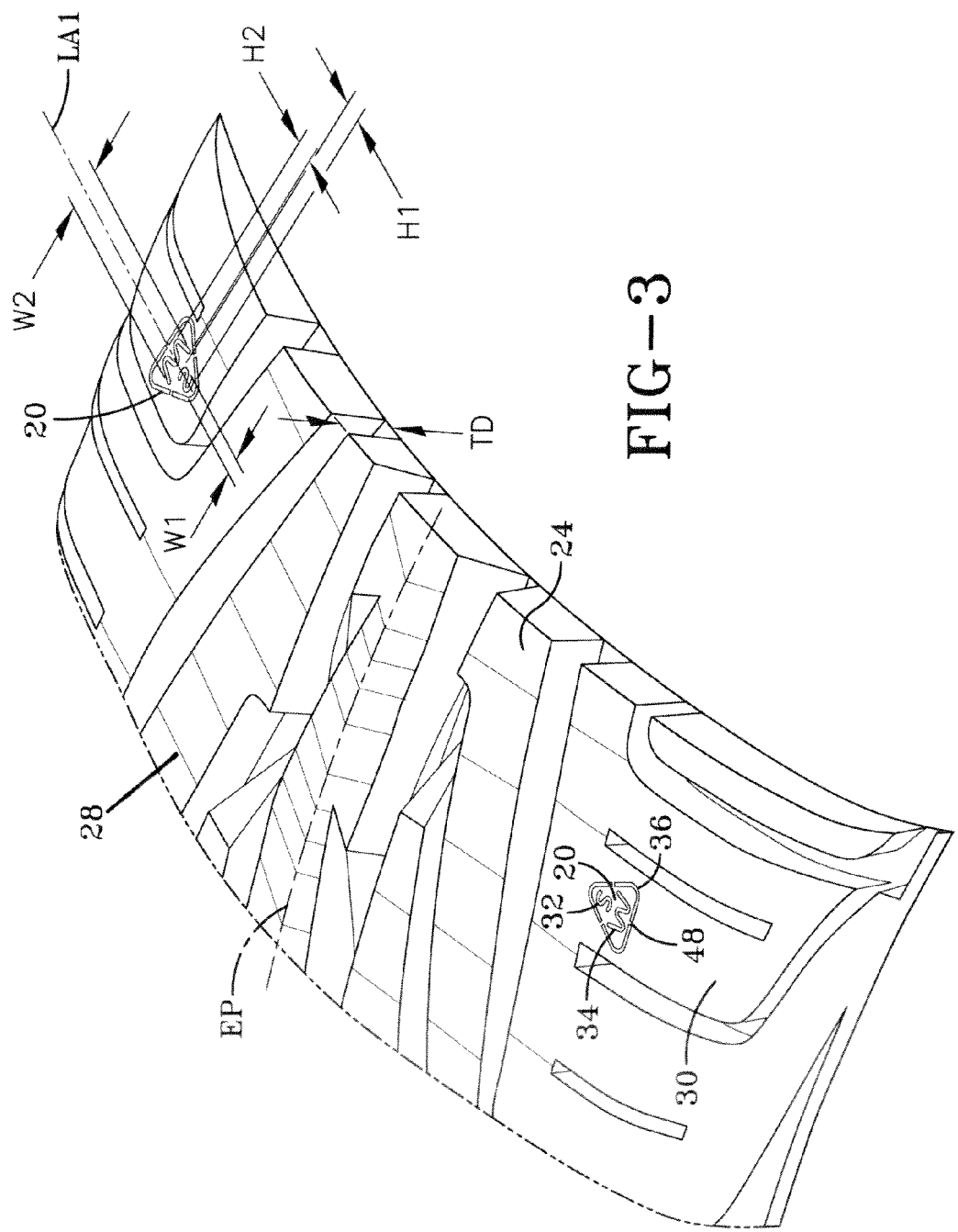
FIG. 3 is a perspective view of a portion of an unworn tire tread.

With reference now to FIGS. 1-3, each TWI 20 may have first, second and third symbols 32, 34, 36. The first and second symbols 32, 34 may be alphanumeric characters, as shown. In one specific embodiment, the first symbol 32 may be S-shaped and the second symbol 34 may be W-shaped. In this case the tire customer can be informed that the S stands for "Smart" and the W stands for "Wear" so together the customer learns that the TWIs 20 are used to accomplish "Smart Wear" for the tread 10. After the S-shaped first symbol 32 wears away, as discussed in one embodiment below, the remaining W-shaped second symbol 34 can be thought of as standing for "Worn" as an indication to the tire customer that the tread 10 is now worn and the tire 40 or at least the tread 10) should be replaced.

Figure 4:
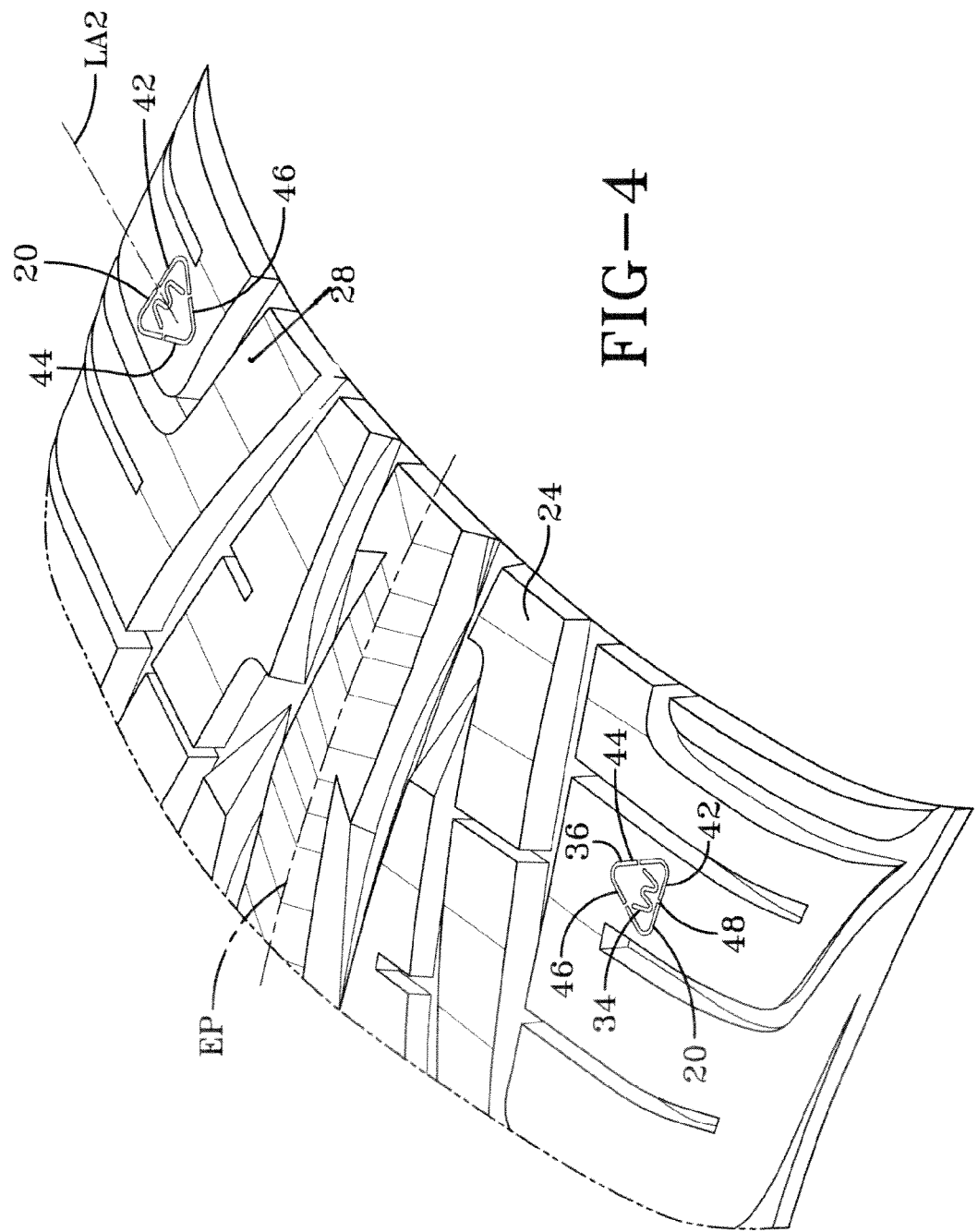
FIG. 4 is a perspective view of a portion of a partially worn tire tread.

With reference now to FIGS. 3-4, the first symbol 32 may have a height H1 and a width W1 and the second symbol 34 may have a height H2 and a width W2. While the size and orientation of the first and second symbols 32, 34 can be any chosen with the sound judgment of a person of skill in the art, for the embodiment shown the ratio H1/H2 is between 0.9 and 1.1, and the ratio W1/W2 is between 0.75 and 0.25. This size and shape optimizes the visibility of the first and second symbols 32, 34 and their relative position with the third symbol 36, as will be discussed further below. The first symbol 32 may have a longitudinal axis LA1 and the second symbol 34 may have a longitudinal axis LA2. In one embodiment, the longitudinal axis LA1 of the first symbol 32 may be substantially parallel to the longitudinal axis LA2 of the second symbol 34. In a more specific embodiment, shown, the longitudinal axis LA1 of the first symbol 32 may be substantially collinear with the longitudinal axis LA2 of the second symbol 34. In yet another embodiment, the longitudinal axis LA1 of the first symbol 32 and the longitudinal axis LA2 of the second symbol 34 may be substantially perpendicular to the equatorial plane EP of the tire 40.

With reference now to FIGS. 1-5, the third symbol 36 may substantially surround the first and second symbols 32, 34, as shown, and may have first, second and third walls 42, 44, 46. In one embodiment, each of the walls 42, 44, 46 is non-continuous and thus has a gap 48. For the embodiment shown, each gap 48 is positioned substantially in the middle of each wall 42, 44, 46. In one embodiment, the third symbol 36 is substantially triangularly shaped and in a more specific embodiment, shown, the third symbol 36 has substantially the shape of an equilateral triangle. In another embodiment, shown, the first wall 42 is substantially parallel to the equatorial plane EP of the tire 40. The second symbol 34 may be positioned on the shoulder side (nearer a shoulder region 22 or 30 of the tire 40 than the mid-section 24 of the tire 40) of the TWI 20 and juxtaposed to the first wall 42. The first symbol 32 may be positioned on the mid-section side (nearer the mid-section 24 of the tire 40 than a shoulder region 22 or 30 of the tire 40) of the TWI 20 and juxtaposed to the intersection of the second and third walls 44, 46. This orientation makes it easy for the tire customer to read the symbols of the TWI 20 when observing the tire 40 mounted onto a vehicle (not shown).

The TWI 20 may be designed so that the first, second and third symbols 32, 34, 36 are visible on the ground contacting surface 28 prior to wearing the tread 10. This unworn status is shown in FIG. 3 where, for the embodiment shown, the S-shaped first symbol 32, the W-shaped second symbol 34 and the triangularly shaped third symbol 36 can all be seen by the customer. After the tread 10 has been worn radially a first amount, the first symbol 32 may become invisible but the second and third symbols 34, 36 remain visible on the ground contacting surface 28. This partially worn status is shown in FIG. 4 where, for the embodiment shown, the S-shaped first symbol 32 cannot be seen by the customer but the W-shaped second symbol 34 and the triangularly shaped third symbol 36 can be seen. After the tread 10 has been worn radially a second amount, greater than the first amount, the first symbol 32 and the second symbol 34 may become invisible but the third symbol 36 remains visible on the ground contacting surface 28. This further worn status is shown in FIG. 5 where, for the embodiment shown, the S-shaped first symbol 32 and the W-shaped second symbol 34 cannot be seen by the customer but the triangularly shaped third symbol 36 can be seen.

Figure 5:
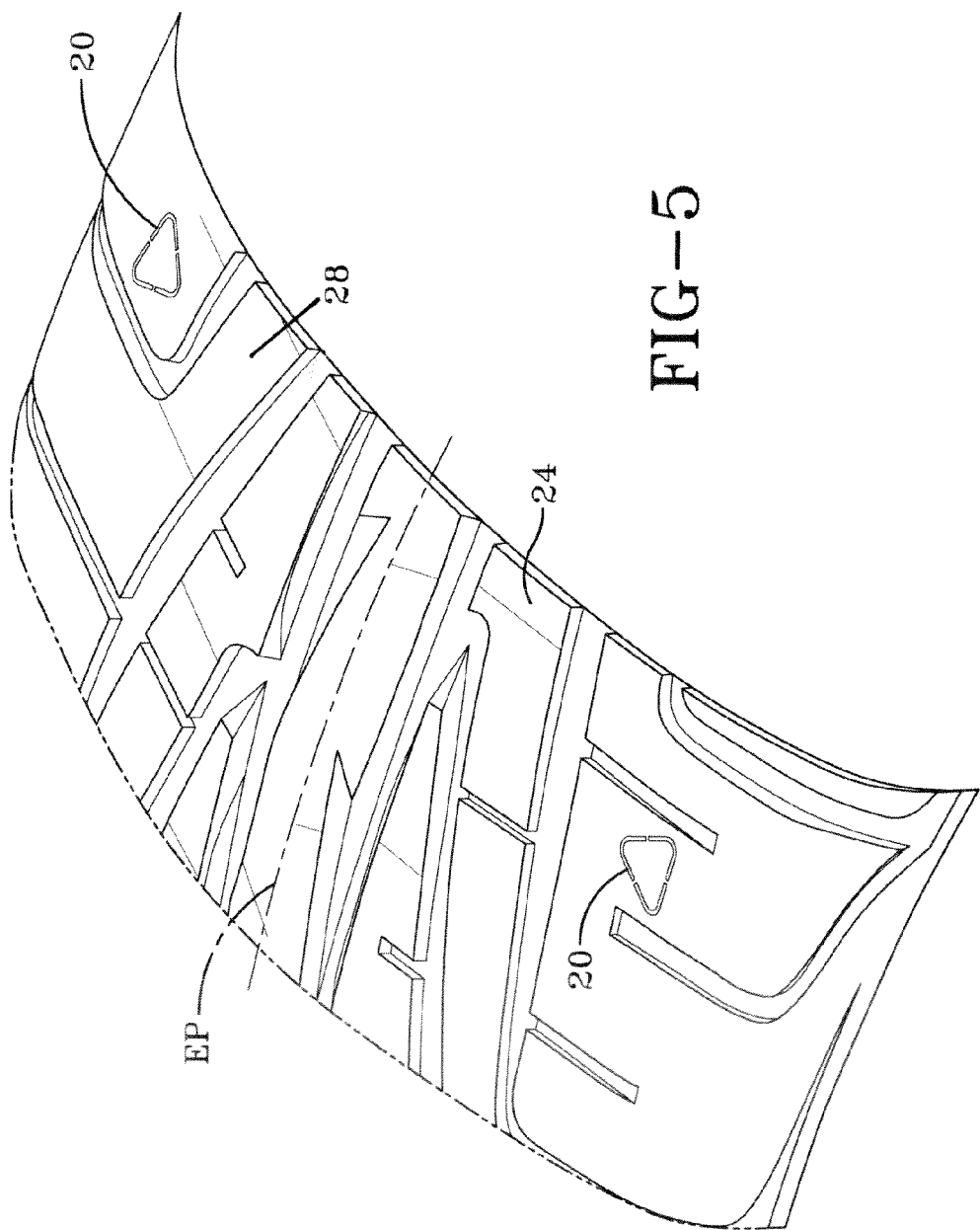
FIG. 5 is a perspective view of a portion of a further worn tire tread.

With reference now to FIGS. 3-5, the amount of tread wear required to attain the partially worn status (that is, the first amount of radial wear of the tread 10) and the amount of tread wear required to attain the further worn status (that is, the second amount of radial wear of the tread 10) can be set by the tire designer for specific applications. In one embodiment, the first amount is between 50% and 99% inclusively of the tread depth TD. In a more specific embodiment, the first amount is between 70% and 95% inclusively of the tread depth TD. In yet a more specific embodiment, the first amount is between 80% and 90% inclusively of the tread depth TD. The second amount, in one embodiment, is all the remaining tread depth TD after the first amount has been worn off. Thus, for some non-limiting examples: (1) if the first amount is 60% of the tread depth TD, the second amount is 40% of the tread depth TD; (2) if the first amount is 75% of the tread depth TD, the second amount is 25% of the tread depth TD; and, (3) if the first amount is 90% of the tread depth TD, the second amount is 10% of the tread depth TD. In another embodiment, the first and second amounts together do not account for all the tread depth TD. Thus, for some non-limiting examples: (1) if the first amount is 60% of the tread depth TD, the second amount may be 30% of the tread depth TD leaving 10% of the tread depth TD to wear with only the third symbol 36 visible; (2) if the first amount is 75% of the tread depth TD, the second amount may be 20% of the tread depth TD leaving 5% of the tread depth TD to wear with only the third symbol 36 visible; and, (3) (1) if the first amount is 90% of the tread depth TD, the second amount may be 7% of the tread depth TD leaving 3% of the tread depth TD to wear with only the third symbol 36 visible.

Figure 7:
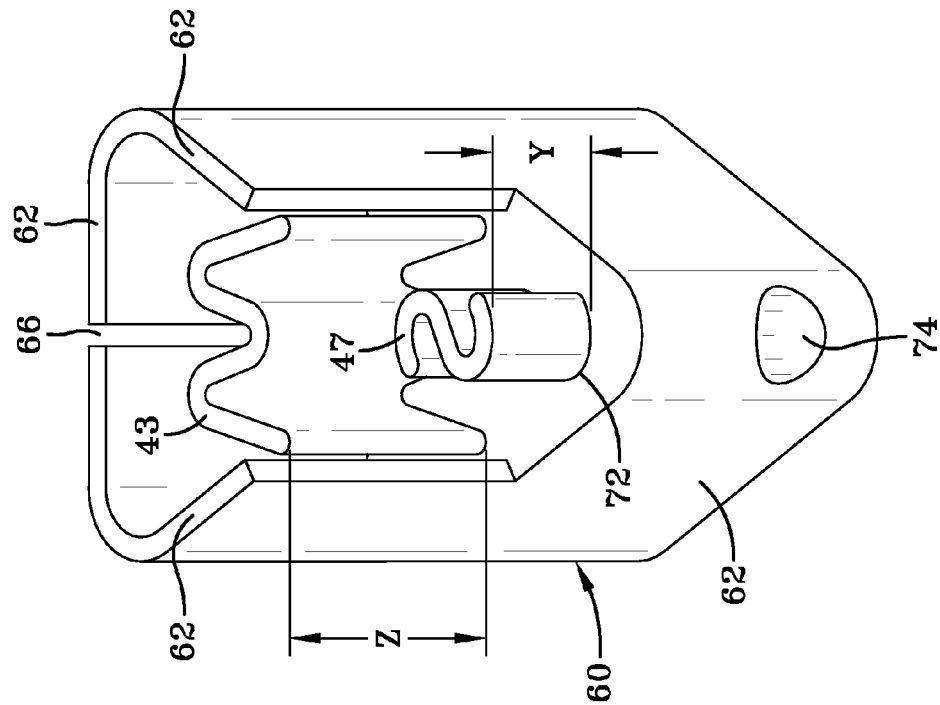
FIG. 7 is a perspective view of the blade of FIG. 6 with portions removed to enable viewing of the internal features of the tread wear indicator.
Figure 6:
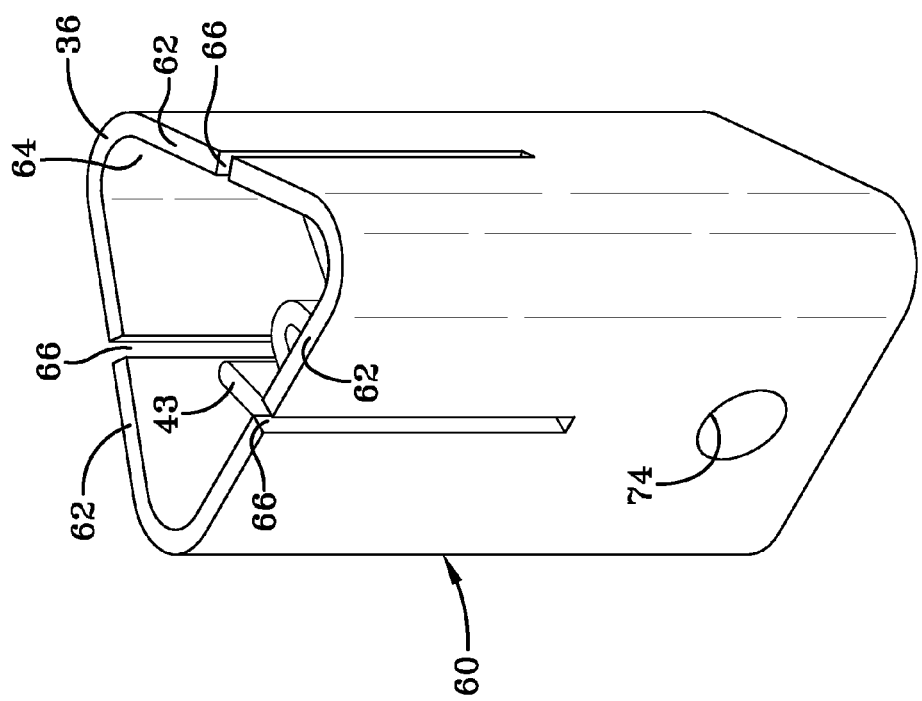
FIG. 6 is a perspective view of an exemplary blade that can be used to form the tread wear indicator of this invention.

With reference now to FIGS. 1 and 6-7, as noted above for the embodiment shown the TWIs are molded into the tread 10 during the vulcanization process. While this molding of the TWIs 20 into the tread 10 can be done in any manner chosen with the sound judgment of a person of skill in the art, in one embodiment a blade 60 may be used to form the tread wear indicator 20. Each such blade 60 can be fitted into prepared openings in a tread forming mold (not shown) in the shoulder regions 30, 22 as previously discussed. An exterior portion 62 may have a hollow inner portion 64. The exterior portion 62 forms the walls 42, 44, 46 of the third symbol 36. Voids 66 may be used to form the gaps 48 in the walls. The voids 66 may serve the function of forming vent openings to allow entrapped air to escape during molding of the tread 10. A first protruding portion 47 may be S-shaped and used to form the first symbol 32. Similarly, a second protruding portion 43 may be W-shaped and used to form the second symbol 34. Both protruding portions 47, 43 may extend from a blade base surface 72 which forms the top surface of the tread wear indicator 20. A hole 74 may be used to help secure the blade 60 in the mold. The exemplary blade 60 while shown as a single piece construction can be made using any number of pieces welded together to form the blade 60 if so desired.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

We claim:

1. A tire tread comprising:
   a tread having first and second shoulder regions and a mid-section between the first and second shoulder regions, the tread also having a tread depth and an outer ground contacting surface;
   a treadwear indicator molded into the first shoulder region of the tread, the treadwear indicator comprising first, second and third symbols;
   wherein the first and second symbols are alphanumeric characters and the third symbol substantially surrounds the first and second symbols;
   wherein the first, second and third symbols are visible on the ground contacting surface prior to wearing the tread;
   wherein the first symbol is invisible and the second and third symbols are visible on the ground contacting surface after the tread has been worn radially a first amount; and,
   wherein the first and second symbols are invisible and the third symbol is visible on the ground contacting surface after the tread has been worn radially a second amount that is greater than the first amount; and,
   wherein the third symbol comprises three non-continuous walls.

2. The tire tread of claim 1 wherein:
   the first symbol is substantially S-shaped;
   the second symbol is substantially W-shaped; and,
   the third symbol is substantially triangularly shaped.

3. The tire tread of claim 1 wherein:
   when viewing the ground contacting surface of the tread the first symbol has a height H1 and a width W1;
   when viewing the ground contacting surface of the tread the second symbol has a height H2 and a width W2;
   the ratio H1/H2 is between 0.9 and 1.1; and,
   the ratio W1/W2 is between 0.75 and 0.25.

4. The tire tread of claim 1 wherein:
   the three non-continuous walls of the third symbol are first, second and third walls;
   the first wall is substantially parallel to the equatorial plane of the tire;
   the second symbol is positioned: (1) on the shoulder side of the tread wear indicator; and, (2) juxtaposed to the first wall; and,
   the first symbol is positioned: (1) on the mid-section side of the tread wear indicator; and, (2) juxtaposed to the intersection of the second and third walls.

5. The tire tread of claim 1 wherein a longitudinal axis of the first symbol is substantially parallel to a longitudinal axis of the second symbol.

6. The tire tread of claim 1 wherein longitudinal axes of the first and second symbols are substantially perpendicular to the equatorial plane of the tire.

7. The tire tread of claim 1 wherein the first amount is between 50% and 99% inclusively of the tread depth.

8. The tire tread of claim 7 wherein the first amount is between 80% and 90% inclusively of the tread depth.

9. A tire tread comprising:
   a tread having first and second shoulder regions and a mid-section between the first and second shoulder regions, the tread also having an outer ground contacting surface and a tread depth;
   first and second treadwear indicators molded respectively into the first and second shoulder regions of the tread, each of the first and second treadwear indicators comprising substantially the same first, second and third symbols;
   wherein the first symbol is substantially S-shaped;
   wherein the second symbol is substantially W-shaped;
   wherein the third symbol is substantially triangularly shaped having three walls and substantially surrounds the first and second symbols;
   wherein the first, second and third symbols are visible on the ground contacting surface prior to wearing the tread;

wherein the first symbol is invisible and the second and third symbols are visible on the ground contacting surface after the tread has been worn radially a first amount of between 70% and 95% inclusively of the tread depth;

wherein the first and second symbols are invisible and the third symbol is visible on the ground contacting surface after the tread has been worn radially a second amount that is greater than the first amount; and, wherein each of the three walls of the third symbol is non-continuous.

10. The tire tread of claim 9 wherein the third symbol has substantially the shape of an equilateral triangle.

11. The tire tread of claim 9 wherein:
when viewing the ground contacting surface of the tread the first symbol has a height and a width W1;
when viewing the ground contacting surface of the tread the second symbol has a height H2 and a width W2;
the ratio H1/H2 is between 0.9 and 1.1; and,
the ratio W1/W2 is between 0.75 and 0.25.

12. The tire tread of claim 9 wherein:
the three walls of the third symbol are first, second and third walls;
the first wall is substantially parallel to the equatorial plane of the tire;
the second symbol is positioned: (1) on the shoulder side of the tread wear indicator; and, (2) juxtaposed to the first wall; and,
the first symbol is positioned: (1) on the mid-section side of the tread wear indicator; and, (2) juxtaposed to the intersection of the second and third walls.

13. The tire tread of claim 12 wherein a longitudinal axis of the first symbol is substantially collinear with a longitudinal axis of the second symbol.

14. The tire tread of claim 13 wherein longitudinal axes of the first and second symbols are substantially perpendicular to the equatorial plane of the tire.

15. A method comprising the steps of:
(A) providing a tire comprising a tire tread having: (1) first and second shoulder regions; (2) a mid-section between the first and second shoulder regions; (3) an outer ground contacting surface; (4) a tread depth and, (5) a first treadwear indicator positioned on the first shoulder region of the tread; wherein the first treadwear indicator comprises first and second symbols that are alphanumeric characters and a third symbol that substantially surrounds the first and second symbols and that comprises three non-continuous walls;
(B) providing the first, second and third symbols to be visible on the ground contacting surface prior to wearing the tread;
(C) wearing the tread radially a first amount resulting in: (1) the first symbol becoming invisible on the ground contacting surface; and, (2) the second and third symbols remaining visible on the ground contacting surface; and,
(D) wearing the tread radially a second amount that is greater than the first amount resulting in: (1) the first symbol remaining invisible on the ground contacting surface; (2) the second symbol becoming invisible on the ground contacting surface; and, (3) the third symbol remaining visible on the ground contacting surface.

16. The method of claim 15 wherein step (A) comprises the step of:
molding the first tread wear indicator into the first shoulder region of the tread during a vulcanization process;
molding a second tread wear indicator into the second shoulder region of the tread during the vulcanization process;
providing the second tread wear indicator with first and second symbols that are alphanumeric characters and a third symbol that substantially surrounds the first and second symbols and that comprises three non-continuous walls; and,
using the first, second and third symbols of the second tread wear indicator as indicated in steps (B), (C) and (D).

17. The method of claim 15 wherein step (C) comprises the step of: wearing the tread radially a first amount that is between 50% and 99% inclusively of the tread depth.

18. The method of claim 17 wherein step (C) comprises the step of:
wearing the tread radially a first amount that is between 70% and 95% inclusively of the tread depth.

19. The method of claim 18 wherein step (C) comprises the step of:
wearing the tread radially a first amount that is between 80% and 90% inclusively of the tread depth.

* * * * *